Jan. 10, 1928.
W. S. JOHNSON
FARE REGISTER
Filed Feb. 10, 1922
1,655,650
2 Sheets-Sheet 1
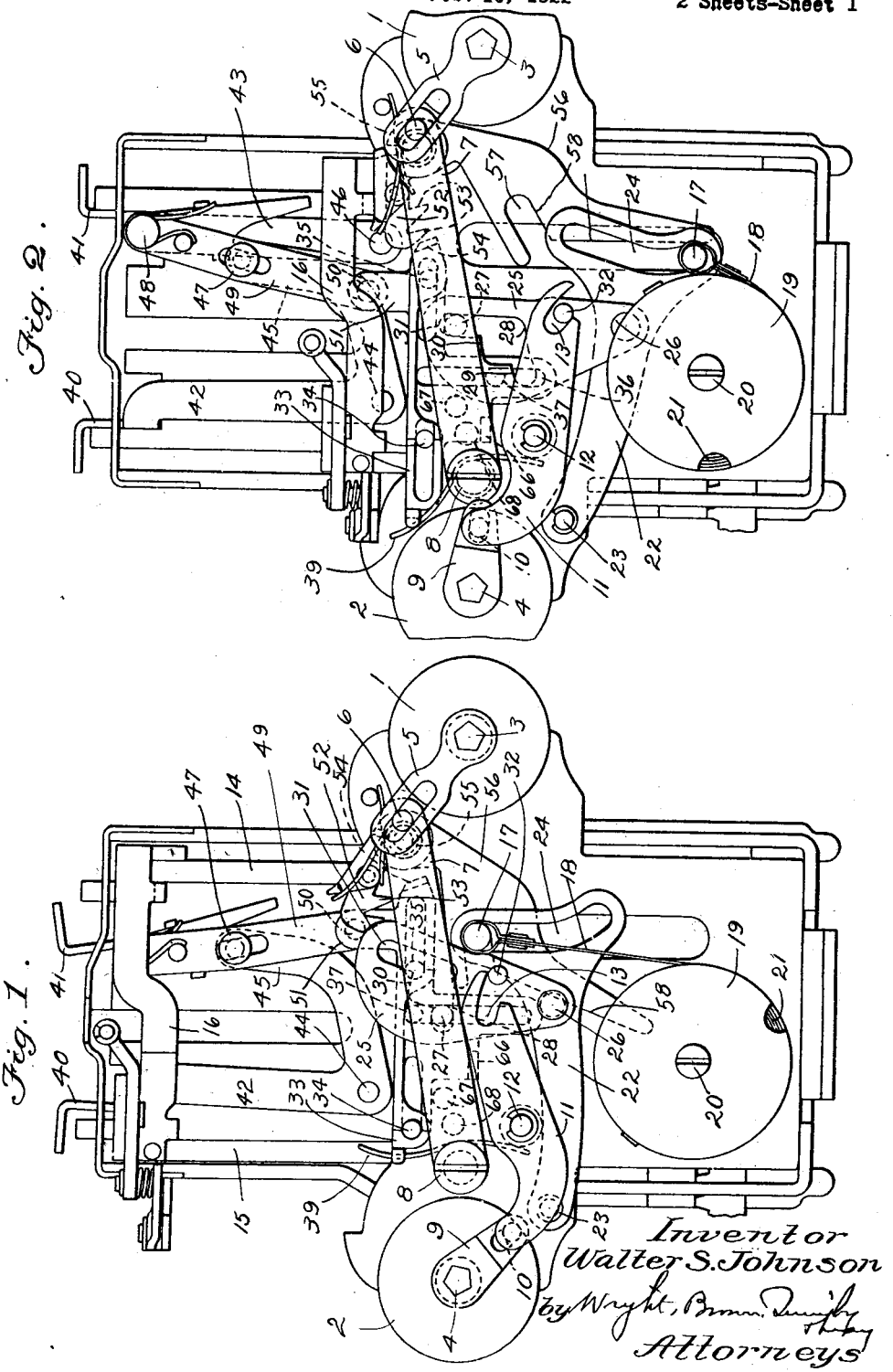
Inventor
Walter S. Johnson
by Wright, Brown, Dunlap
Attorneys Jan. 10, 1928.
W. S. JOHNSON
FARE REGISTER
Filed Feb. 10, 1922
1,655,650
2 Sheets-Sheet 2
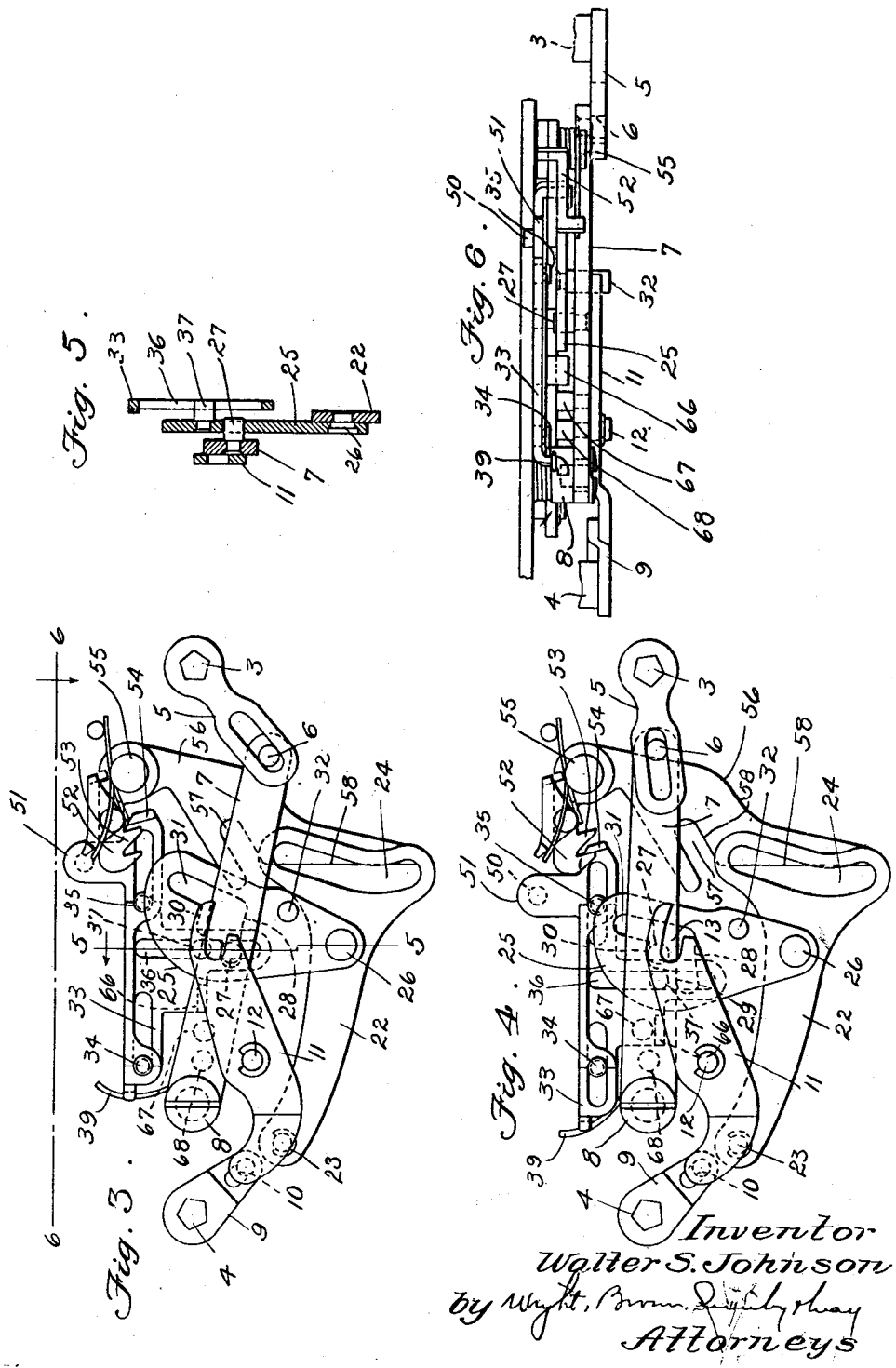
Inventor
Walter S. Johnson
by Wright, Brown, Quinby & May
Attorneys Patented Jan. 10, 1928.

1,655,650

UNITED STATES PATENT OFFICE.

WALTER S. JOHNSON, OF PROVIDENCE, RHODE ISLAND, ASSIGNOR TO ROOKE AUTOMATIC REGISTER COMPANY, OF PROVIDENCE, RHODE ISLAND, A CORPORATION OF MAINE.

FARE REGISTER.

Application filed February 10, 1922. Serial No. 535,572.

The present invention relates to fare registers and analogous devices or machines capable of distinctively registering unit articles of different qualities, or the values or other specific characteristics of such articles; and is particularly adapted to the portable type of fare register disclosed in the prior patents of George F. Rooke No. 690,079 granted December 31, 1901, and No. 1,294,308 granted February 11, 1919, and of Joseph A. Turck, No. 1,160,215, granted November 16, 1915. Certain principles and features of the invention, however, are applicable to registering or recording machines which are not necessarily portable; and as to such principles and features my protection is not limited by the specific illustrative explanation of the invention given in this specification, or otherwise than as required by the terms and for the validity of the appended claims.

In its general purposes, objects and functions and results the register disclosed in this specification is substantially like that disclosed in my companion specification filed concurrently herewith and numbered 535,571, and to that end the register is provided with a plurality of counters for respectively tallying numbers or values of respectively different tickets inserted in the machine, and one of the counters is, and both may be, adapted to register selectively different values.

As compared with said companion specification the invention here disclosed and for which I desire to obtain protection consists in a lever mechanism for operating the register counters selectively under control of the inserted ticket or other article; and in a modified or alternative form of lock for holding the selector in the position where it is placed by the inserted article, while the tallying or registering of the article is being effected. Claims for subject matter common to this and the said companion application are made in the latter, and the claims appended to this specification are directed to the features in which the machine here disclosed differs from that disclosed in said companion application. Hence, only so much of the machine as is necessary to explain the appended claims is described in detail in this specification, reference being directed to the companion specification and the aforesaid prior patents for explanation of features not herein described.

In its use as a fare register and for analogous purposes, this machine is controlled by an inserted coin or ticket of any character, whether metallic or of other material and whether circular or of other outline; and for some uses it may be controlled and caused to tally specifically different articles, all within the basic principles of the invention. Hence in this specification and the claims appended thereto I have used the word "ticket" with a generic meaning to include all of the articles of any sort which may be counted or tallied or registered in a selective manner, whether such articles are coins of any monetary system or tickets in the specific meaning of that word, or articles of any other sort which may vary from one another in a specific dimension.

In the drawings which are herewith furnished,—

Figure 1 is a front elevation of the fare register machine removed from its case and represented as being in the "set" position ready for the reception of a ticket.

Figure 2 is a similar view showing the condition of the machine after the insertion of a ticket of the greatest width for which the machine in adapted.

Figure 3 is a view of the recording mechanism removed from the machine, and illustrated as in the condition for registering values of tickets of the smallest width which the machine in designed to receive.

Figure 4 shows the mechanism depicted in Figure 3 placed in condition to register tickets of intermediate size.

Figure 5 is a cross section on line 5—5 of Figure 3.

Figure 6 is a plan view of the particular mechanism shown in Figure 4.

Like reference characters designate the same parts wherever they occur in all the figures.

The two counters of the register are indicated at 1 and 2 and their driving shafts at 3 and 4, respectively. These counters are preferably of the type shown and described in the aforesaid patents, although they may be any suitable type for the purpose. To the shaft 3 of counter 1 is connected a slotted arm 5, the slot of which is occupied by a pin 6 on a lever 7 pivoted by a stud 8 to the frame. To the shaft 4 of the counter 2 is connected a slotted arm 9, the slot of which is occupied by a pin 10 carried by a lever 11 which is pivoted upon a stud 12 fixed to the frame, and said lever has a notch 13. The carriage which receives the inserted ticket and operates the tallying mechanism is essentially like that shown in my said companion application, and comprises side members 14, 15 and a cross member 16, adapted to slide upon suitable guiding means provided in the frame. An actuating pin 17 is mounted on the carriage and is connected by a flexible strap 18, preferably a steel tape, with a barrel 19 rotatably mounted on the fixed pivot stud 20 and containing a coiled spring 21, being the spring motor which propels the carriage from the position shown in Figure 1 to that shown in Figure 2, when the holding latch is released by insertion of a ticket.

In this specification and in the claims the word "ticket" is used to include an object of any sort having value for the purpose to which this register is applied, whether the same is a coin, a metal disk or a body of other material having sufficient stiffness for the purpose of actuating the selecting mechanism and tripping the latch which releases the carriage. Specifically the machine here illustrated is designed to register nickels and dimes upon the counter 1 and quarter dollars upon the counter 2; but other specific values may be registered by essentially the same means as that herein disclosed. The important facts for the purposes of this invention, are that two or more tickets of different values are adapted to cause additions by the counter 1 of different amounts in proportion to their respective values, without affecting the counter 2 and that still another ticket is adapted to cause actuation of the counter 2 without having any effect upon the counter 1; and that the occurrence of actuation of either counter, and the amount of the sums respectively tallied by the counter 1 are governed by the widths of the inserted tickets.

Registers of the particular form here shown for illustration of the generic invention are intended to be used by employees of common carriers to collect cash fares or tickets from passengers, and are used by being held in the hand of the employee and presented to the passenger in such a manner that the latter may insert a coin or ticket into the slot provided for that purpose. Hence in the following description of the machine the operator thereof will be referred to as the "collector," and the person who inserts the ticket will be referred to as the "passenger," but all without intent to indicate any limitation in the scope of the protection which I claim.

Proceeding with a description of the particular machine here illustrated, 22 represents a lever which is pivoted to the frame at 23 and has a cam slot 24. This lever may be considered as a driver by which the counters are operated through the medium of transmission mechanisms of which the levers 7 and 11 are parts. It will be called, for the purposes of this description, the "driving lever." The upper part of its cam slot, when in the set position shown in Figure 1, coincides with the path of the actuating pin 17 and the lower part of said slot is inclined to such path, wherefore the actuating pin, in the latter part of its downward movement is adapted to rock the lever from the position of Figure 1 to that of Figure 2, and its upward movement, when the machine is reset, is adapted to return the lever to the previous position.

A transmission member 25, which is called for the purpose of this description a "tumbler plate", and is a part, common to both, of the transmission mechanisms above referred to, is pivoted by a stud 26 to the driving lever 22 and is formed with an interior opening into which enters a pin 27 projecting rearwardly from the lever 7. Said opening is bounded on its underside by the abutment edge 28 and on its upper side by shoulders 29 and 30, located at respectively different distances from said abutment edge, and by a notch 31. By oscillation of said tumbler plate on its pivot, in a direction transverse to that in which it is moved by the driving lever, either of the shoulders 29 or 30, or the notch 31, can be brought into line with the stud 26 and pin 27. In other words, either shoulder may be so placed that the path in which it is moved by the driving lever includes the pin 27 and approximately coincides with the path of the latter. Thereby a greater or less portion of the driving movement of said tumbler plate is transmitted to the lever 7, and from the latter to the actuating arm of the counter. When the shoulder 29 thus acts, the full movement of the tumbler plate is transmitted without lost motion to the lever 7, and the counter is caused to add two units to the tally. When shoulder 30 thus acts, approximately half of the full movement is lost motion, and the other half is transmitted to the lever 7, and the counter is caused to add one unit to the tally; and when the notch 31 is brought into line with the pin 27, all of the motion of the tumbler plate is lost, so far as the lever 7 is concerned, but a stud 32 on the tumbler plate is then brought into the notch 13 of lever 11 which actuates the counter 2; whereby at such times the movement of the carriage causes tallying by counter 2 without having any effect upon counter 1. At all times except when the condition last described obtains, the stud 32 is out of notch 13 and none of the motion of the tumbler plate is transmitted to counter 2.

Shifting of the tumbler plate in the manner and for the purpose just described is effected by a selector 33 which is a slotted plate or bar arranged to slide upon studs 34 and 35 fixed to the frame, through a total distance limited by the length of said slots. Said selector has a vertical slot 36 entered by a pin 37 on the back of the tumbler plate. Normally the selector is held in its extreme right-hand position with respect to these drawings (which is that shown in Figure 1) by a spring 39 coiled about the pivot 8 and bearing at one end against the selector, while its other end reacts against the pivot 12. A ticket inserted into the entrance slot of the machine passes between two fingers 40 and 41 carried by arms 42 and 43, respectively, and offset from said arms so as to extend into the passage provided within the frame to conduct the ticket from its point of entrance to its point of exit. The arm 42 is mounted on a pivot 44 fixed in the frame and is part of a lever structure having a second arm 45, while the arm 43 is pivoted on a stud 46 fixed to the frame. These arms are connected by means of studs or pins 47 and 48, respectively, with a lever 49 which is coupled by a pin 50 with a lug 51 rising from the selector. The coupling pins 47 and 50 pass through slots in lever 49 in order to permit movement of the various coupled parts in their diverging paths.

When the fingers 40 and 41 are spread apart from their normal condition of closest approach to one another, (shown in Figure 1) the pins 47 and 48 move in relatively opposite directions, thereby swinging the lever 49 so as to shift the selector toward the left; while the spring 39 acting on the selector tends to return and retain the fingers in their normal condition. This condition allows a ticket of the smallest size for which the machine is designed to pass without spreading them, and in the specific instance described the ticket which thus passes is a dime. A ticket of greater width spreads the fingers more or less and so shifts the selector and the tumbler plate to one or the other of its prescribed positions. On account of the function which said fingers perform they may be termed "selector fingers."

This placement of the selector is the first function performed by the inserted ticket, taking place before the carriage begins its travel. The selector is locked in its displaced position by a lock 52 under the control of the actuating pin 17. Said lock has teeth 53 adapted to engage with a tooth or lug 54 on the selector, one or another of the teeth 53 being placed, upon the descent of the carriage, back of the tooth 54, as shown by comparison of Figures 2, 3 and 4. This lock differs specifically from the one shown in my aforesaid companion specification in being a reversal thereof to the extent that it has a plurality of teeth adapted to coact with a single tooth on the selector. Said lock is pivoted on a stud 55 and is connected in any suitable way, whether by being made as an integral part thereof or otherwise connected thereto, with a controlling lever 56 which is pivoted on the same stud. It is not important to the disclosure of the present invention or to the protection which I claim how said lock and controlling lever are connected. It is sufficient for the present that they form essentially a rigid unit when the locking action takes place. Said control lever is formed with a notch 57 adapted to receive the actuating pin 17, and a cam surface 58 adjacent to said notch, on which the actuating pin is adapted to bear, whereby it is moved by the actuating pin at the beginning of the travel of the carriage and is then held thus in displaced position during the balance of such travel and until the carriage is returned to "set" position.

In order to prevent over movement of the counter operating lever 7 when the shoulder 30 acts upon it (that is, when the lower values are to be registered on the counter 1), and to prevent positively any motion of said lever when the counter 2 is operated, I provide on the selector a stop lug 66 and on the lever 7 two studs 67 and 68. When the selector is placed in the intermediate position (by the coin of lower value) the lug 66 is placed below the stud 67, as shown in Figure 4, and the latter is then distant from the lug by just the amount needed to stop the lever when tallying of the lower value has been effected. When the selector is positioned to cause operation of the left hand counter, then the lug 66 is placed under the stud 68 and the latter is so near the lug as to prevent great enough movement of the lever to cause any actuation of the counter 1.

The mechanism for transmitting motion to the counters herein described is susceptible by modification in detail, but without change of principle, to enable registration by the counter 1 of tickets of more than two different values, or of tickets having different ratios of value to dimensions than that shown, or to cause the values of only one class of tickets to be there registered. Such mechanism is of great simplicity and is effective to carry out the intended purposes with certainty and accuracy.

All of the levers, arms and plates described are preferably made by stamping from sheet metal, being of sufficient thickness to be stiff, and as thus made can be produced and assembled at moderate cost.

What I claim, and desire by Letters Patent to secure is:

1. A register comprising a plurality of registering counters, levers operatively associated with each of said counters, an actuator, a transmission member, and means for selectively engaging said transmission member with either of said levers exclusively for imparting independent movement to one or the other thereof.

2. A register comprising a plurality of registering counters, levers operatively associated with each of said counters, an actuator, a transmission member, and means for selectively engaging said transmission member with either of said levers exclusively for imparting independent movement of one or the other thereof, said transmission member having means for causing one of the levers to be moved different amounts according to the position of said member relatively to said levers.

3. A register comprising an actuator adapted to be moved when a ticket is inserted into said register, a counter, having an arm, a pivoted lever having a pin and slot connection with said arm for operating said counter, a transmission member adapted to be moved by said actuator and being engageable with said counter operating lever in different positions wherein, respectively, it is enabled to transmit different extents of movement thereto, and selecting means controlled by the inserted ticket for so placing said transmission member.

4. A register comprising an actuator adapted to be moved when a ticket is inserted into said register, a counter, having an arm, a pivoted lever having a pin and slot connection with said arm for operating said counter, a transmission member adapted to be moved by said actuator and being engageable with said counter operating lever in different positions, wherein, respectively, it is enabled to transmit different extents of movement thereto, said transmission member being placeable in still another position wherein it is adapted to pass through its full travel without imparting any movement to the counter operating lever, and selecting means controlled by the inserted ticket for placing said transmission member in one or another of the aforesaid positions according to a characteristic dimension of the ticket.

5. A register comprising two counters, a common driver therefor, a common transmission member for both counters carried by said driver, separate driven mechanisms for the respective counters and selective means controlled by an inserted ticket for placing said transmission member into motion-transmitting relation with one or the other of said driven mechanisms exclusively.

6. In a register, two counters, operating levers respectively connected to the two counters, a single driver, a transmission member connected to said driver and being shiftable transversely to the direction in which it is moved by said driver and having provisions for making engagement with one of said levers exclusively when shifted in one direction and with the other of said levers exclusively when shifted in the other direction, yielding means normally holding said transmission member in one of the positions herein indicated and for returning it thereto, and selective means controlled by an inserted ticket of larger than minimum dimension for displacing the transmission member in opposition to the force exerted by said yielding means.

7. In a registering machine two counters, an operating member coupled to each of said counters, a single driver, a transmission member connected to said driver and shiftable transversely to the driving movement thereof, one of said operating members having an abutment and the transmission member having a plurality of abutments adapted to be placed in position for imparting greater or less movement to one operating member and to be placed out of operative relation to the first member altogether by shifting of the transmission member; the other of said operating members and the transmission member having complemental abutments adapted to be brought into operative relation when the member is placed in the relation last indicated, and to be put out of operative relation when either of the first-named abutments of the transmission member is in position to act on the abutment of the first-named operating member.

8. In a registering mechanism, the combination with a counter, of an operating lever, having an abutment, a driver, a shiftable transmission member connected with the driver, and having a plurality of abutments adapted to be placed by shifting of said member into position to engage the abutment of said lever to impart movement thereto, and being respectively differently located longitudinally of the path of driving movement of said member, a displaceable selector connected to shift said member, and complemental stops connected with said lever and selector arranged to arrest movement of the lever when one of said abutments reaches the end of its imparting movement.

9. In a register, a counter, an operating member for said counter, having an abutment and a stop, a driver, a transmission member connected to said driver and movable therewith having abutments differently positioned in the general direction of driving movement of said member, the transmission member being laterally displaceable to bring either of the abutments into driving alinement with the abutment of said operating member, a ticket controlled selector for so shifting said transmission member, and a stop controlled by said selector arranged to coact with the stop on said operating member for arresting said operating member when that abutment of the transmission member which imparts the less extent of movement to the operating member has moved said operating member as far as it is able to.

10. In a register as claimed in claim 9, a second counter, an operating member for said counter having an abutment, the transmission member having a complemental abutment placeable in position for acting on the abutment of said second operating member, and the transmission member then being placed where neither of its first-named abutments will act upon the abutment of the first operating member, and the first operating member having a second stop in position to be arrested by a selector controlled stop to prevent any action of the first operating member.

11. In a registering mechanism, the combination with a counter and a selective driving mechanism therefor, of a selector shiftable to alter the relation of said driving mechanism and a locking dog for the selector, the selector having a tooth-like projection and the locking dog having a plurality of tooth-like projections cooperative therewith to hold the selector in either of a number of different positions.

12. In a register two counters, selective operating mechanisms for the said counters, a selector movable to make either of said mechanisms operative and the other inoperative, and a lock for holding the selector in either of the positions wherein it accomplishes said effects, said selector having a tooth-like projection and the lock having a plurality of teeth adapted to cooperate with said projection to hold the selector in either of its positions.

In testimony whereof I have affixed my signature.

WALTER S. JOHNSON.